United States Patent [19]

Hostetler

[11] Patent Number: 4,944,484

[45] Date of Patent: Jul. 31, 1990

[54] GATE VALVE WITH LOCKING HANDLES

[75] Inventor: Eldon Hostetler, Middlebury, Ind.

[73] Assignee: Ziggity Systems, Inc., Middlebury, Ind.

[21] Appl. No.: 372,231

[22] Filed: Jun. 26, 1989

Related U.S. Application Data

[63] Continuation of Ser. No. 831,068, Feb. 20, 1986, abandoned, which is a continuation of Ser. No. 694,697, Jan. 25, 1985, abandoned.

[51] Int. Cl.$^5$ .............................................. F16K 35/00
[52] U.S. Cl. .................................... 251/101; 251/100; 251/327; 251/366
[58] Field of Search ............... 251/89, 100, 101, 95, 251/367, 366, 327, 329; 285/319, 921; 24/241 PS, 614, 615, 654, 580, 662; 403/311, 344

[56] References Cited

U.S. PATENT DOCUMENTS

| | | | |
|---|---|---|---|
| 2,763,459 | 9/1956 | Anderson | 251/100 |
| 3,316,929 | 5/1967 | Milette | 251/77 |
| 3,350,056 | 10/1967 | Blumenkranz | 251/100 |
| 3,443,788 | 5/1969 | Grove | 251/112 |
| 3,588,149 | 6/1971 | Demler | 285/319 X |
| 3,603,621 | 9/1971 | Parsons | 285/921 X |
| 3,844,531 | 10/1974 | Grengs | 251/327 |
| 3,940,106 | 2/1976 | Hart et al. | 251/100 |
| 3,941,349 | 3/1976 | Pierson | 251/100 |
| 3,955,647 | 5/1976 | Tine et al. | 251/89 X |
| 4,456,026 | 6/1984 | Kantor | 251/367 X |

FOREIGN PATENT DOCUMENTS

| | | | |
|---|---|---|---|
| 473263 | 8/1927 | Fed. Rep. of Germany | 24/662 |
| 707776 | 7/1931 | France | 24/662 |
| 320976 | 9/1934 | Italy | 251/101 |

*Primary Examiner*—Noah P. Kamen
*Attorney, Agent, or Firm*—Barnes & Thornburg

[57] ABSTRACT

A gate valve is provided which includes a body having exterior catches and a handle with resilient latches integrally formed with the valve stem to snap lock over the catches on the body when the valve is closed. The gate valve closes and locks simultaneously to cut off flow through a passage by a single axial motion and is unlocked to open the valve by rotational motion. Further, when the resilient latches snap over the catches, the operator hears an audible snap thereby assuring the operator that the valve is securely locked in the closed position. The gate valve body is preferably formed by ultrasonic welding of two identical half members.

6 Claims, 2 Drawing Sheets

GATE VALVE WITH LOCKING HANDLES

This application is a continuation of application Ser. No. 831,068, filed Feb. 20, 1986, which is a continuation of application Ser. No. 694,697, filed Jan. 25, 1985, both abandoned.

BACKGROUND AND SUMMARY OF THE INVENTION

This invention relates to gate valves, and, more specifically, to locking gate valves. Although the invention is widely applicable for its purpose, it has special utility in poultry watering systems.

In the environment of gate valves, it is known to provide a body wherein an opening forms a flow passage. A slideable valve member is typically enclosed within the body and connected by a stem or rod to external means for manipulating the valve into open and closed positions relative to the flow passage. It is also known to provide for sealing means about the valve to prevent leakage when the valve is in a closed position. However, many prior gate valves do not have locking means to prevent inadvertent opening of the flow passage. Prior gate valves that have incorporated locking means for keeping the valve shut typically require significant amounts of time and effort by multi-step techniques for opening or closing and locking the valve in a closed position.

U.S. Pat. No. 3,443,788 shows a gate valve which prevents inadvertent flow through the use of locking pins. However, these locking pins must be turned into the locking position in a separate motion after the gate valve has been closed. This arrangement requires more time and is more inconvenient than a one-step or single action locking method.

U.S. Pat. No. 3,316,929 locks down the gate valve. However, the valve must be pressed closed and then the handle must be rotated to engage the handle on a ledge of the body. Further, because of the force of the springs, the operator may not know without a visual check if the handle has been properly locked in the closed position.

In poultry watering systems it is especially important that the gate valve be securely locked when closed. Poultry have a tendency to roost on portions of the watering equipment, including the external portion of the valve stem. If the valve is not securely locked, the valve may be accidentally opened by the poultry and the resulting excessive water flow could lead to flooding of the poultry cage area. At the same time, a large number of these valves need to be opened and closed manually at several times during a single day in typical poultry operations. Thus, it is desirable that the opening and closing mechanisms and techniques also be simple, relatively fast, and inexpensive.

It is therefore an object of the present invention to provide a gate valve which prevents inadvertent opening of the flow passage.

It is a further object of the present invention to provide a gate valve which can be closed and locked shut with a single, short axial motion.

It is a further object of the present invention to provide a gate valve which may be securely locked closed to prevent inadvertent opening by poultry and readily opened by an operator.

It is a further object of the present invention to assure the operator that the gate valve has been locked in the closed position.

These and other objects are achieved in accordance with a preferred embodiment of the present invention by providing a gate valve having a body with integral catches thereon. Resilient latches are integrally formed on the valve stem, which is rotatably attached to the valve member, such that they can be bent over the catches on the body and snap lock the gate valve in the closed position with a single axial motion. To release the lock, the stem and latches are rotated off the catches, and the valve can be freely moved from the closed to opened positions. The gate valve body is formed by the ultrasonic welding of two identical half members made from the same mold. The body has seals attached to the inside of each half member which surround the flow passage on either side of the valve member. The stem is manipulated axially to move the gate valve into and out of the closed position.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
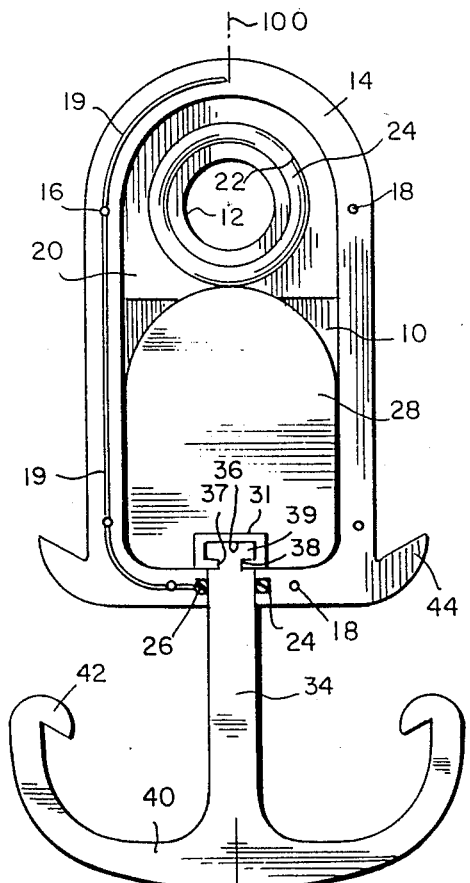
FIG. 1 is a schematic top interior view of a gate valve assembly, as shown in the open position with the top half member of the body removed, in accordance with a preferred embodiment of the present invention.
Figure 2:
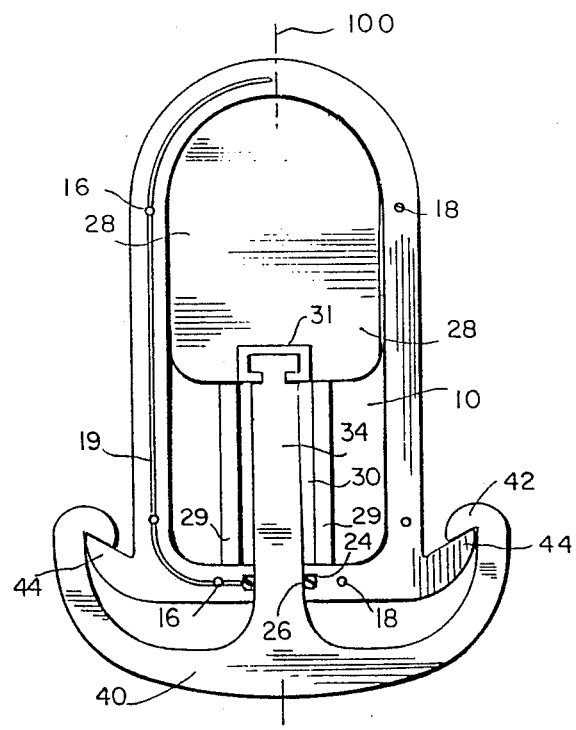
FIG. 2 is a schematic bottom interior view of the gate valve assembly of FIG. 1, as shown in the open position with the bottom half member of the body removed.
Figure 3:
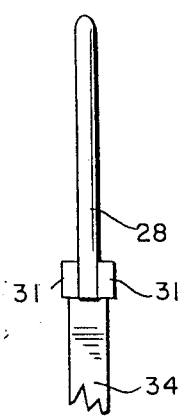
FIG. 3 is a partial side view of the valve member and connecting portion of the stem for the gate valve assembly of FIG. 1.

Referring to FIGS. 1 and 2, which illustrate a preferred embodiment of the present invention, the gate valve body or housing is preferably formed from two identical half body members 10 having flow passages 12 therethrough. A valve member 28 is slidably disposed within the interior of the body to shut off flow through each passage 12 when in a closed position (FIG. 2) and allow such flow when in an open position (FIG. 1). A stem 34 is rotatably attached to valve member 28. A handle 40 and resilient latches 42 are preferably integrally formed with stem 34. Catches 44 are also preferably integrally formed on the body and are engagable with latches 42 to snap lock valve member 28 in the closed position.

In preferred embodiments, the gate valve body elements are formed from plastic materials and each half body member 10 is made from a single, common mold. Valve member 28, unitary stem 34, handle 40 and resilient latches 44 can likewise be formed from molded plastic materials.

Figure 4:
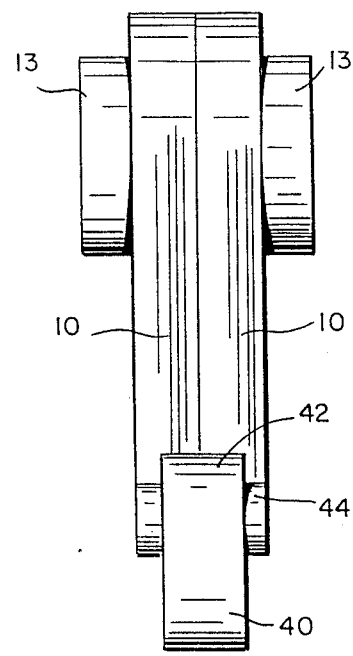
FIG. 4 is an exterior side view of the gate valve assembly of FIG. 1 as shown in the closed position of FIG. 2.

Each half body member 10 has a cylindrical flow passage 12 therethrough leading from the body interior through exterior branches 13 (FIG. 4) which communicate with a hose or pipeline (not shown). A raised edge 14 is provided around the perimeter of the interior of each body member 10 defines the abutting surfaces for joining the two separate body members into a unitary body. Raised pins 16 are spaced apart on one side and complimentary pin recesses 18 are provided on the other side of raised edge 14 to assure accurate registration of the separate body members when brought together for ultrasonic welding. Further, raised edge 14 is provided with a projecting rib 19 along one-half (the left side as shown, for example, in FIG. 5) of the perimeter of each body member 10. Rib 19 does not project above raised pins 16. When body members 10 are brought together, the raised ribs 19 on each body member 10 form one continuous rib around the entire perimeter valve body to assist in and accommodate ultrasonic welding.

A raised platform 20 on the interior of each body member 10 is formed within and below raised ridge 14 and surrounds flow passage 12. An annular depression 21 is formed into raised platform 20 around flow passage 12. A resilient annular or O-ring seal 22 is disposed in annular depression 21.

A stem groove 23 for receiving stem 34 is formed in raised ridge 14 on the end of the body member opposite flow passage 12. An O-ring groove 24 is formed into raised ridge 14 cutting through stem groove 23 and extending deeper than stem groove 23. An O-ring seal 26 is disposed in O-ring groove 24.

Figure 5:
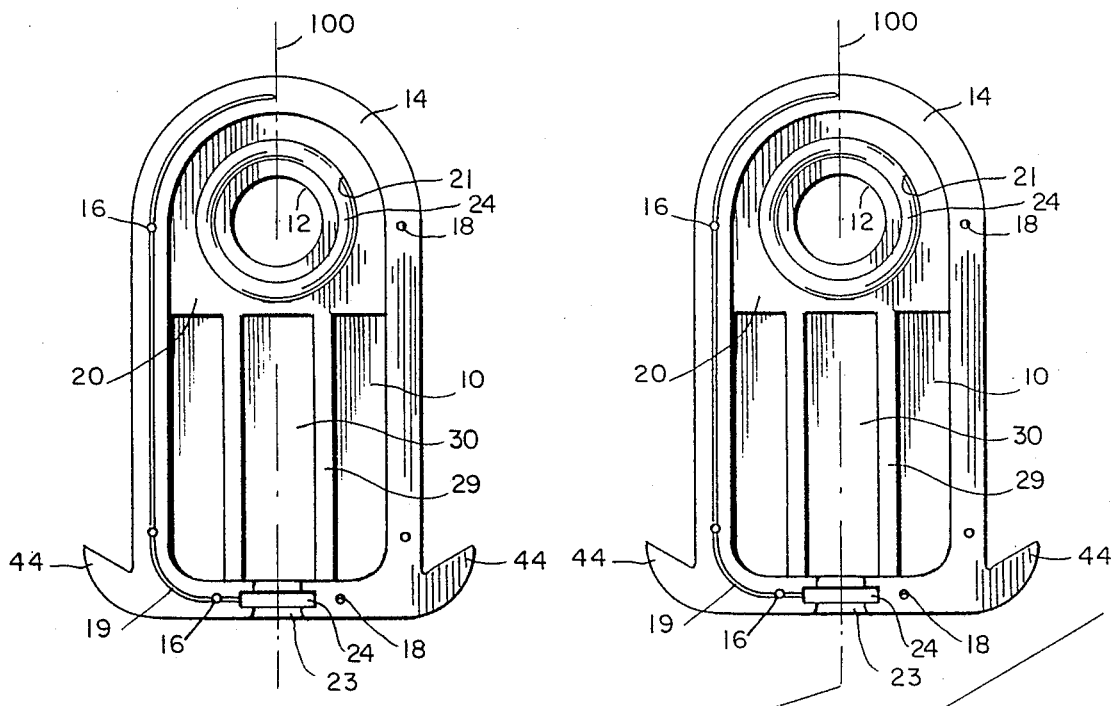
FIG. 5 is an exploded view of the associated parts of the gate valve of FIG. 1.
Figure 5:
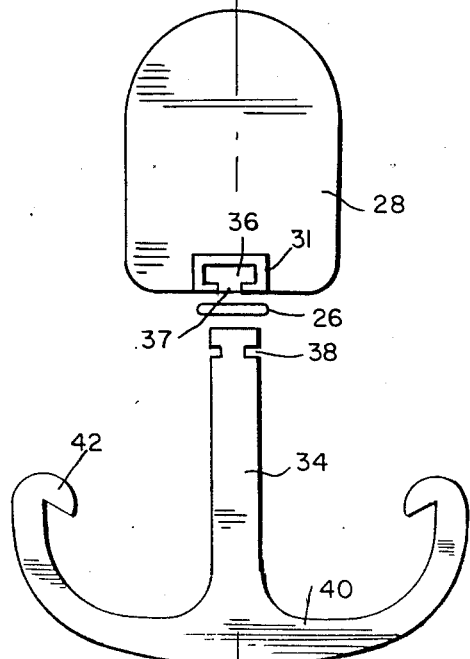

A flat valve member or valve blade 28 is mounted to be slidably disposed along longitudinal axis 100 within the valve body (FIG. 1 and 2). Valve key 31 is formed on both sides of valve member 28 at the end opposite flow passage 12 (best shown in FIG. 6). Referring to FIGS. 2 and 5, each body member 10 has a pair of parallel raised internal ridges 29 defining a keyway 30 within which valve key 31 is slidable.

Figure 6:
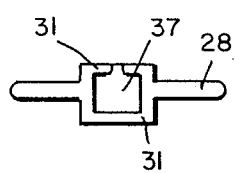
FIG. 6 is an end view of the valve member of the gate valve of FIG. 1 on the end which attaches to the stem.

Valve stem 34 is rotatably attached to valve member 28. Referring to FIGS. 5 and 6, this attachment is made by providing at least one side of valve key 31 with a slot 36 and an entry groove 37 which leads into slot 36. Stem 34 is provided with a notch or recess 38 which forms a stem head 39 on the end of stem 34. Recess 38 is configured with respect to groove 37 such that recess 38 is receivable within groove 37. Stem head 39 is configured with respect to slot 36 such that when recess 38 is fit into groove 37, stem head 39 is rotatably received within slot 36. Stem head 39 is so configured that once within slot 36, it is not removable by axial motion, thereby attaching stem 34 to valve member 28. An O-ring 26 to be disposed in O-ring groove 24 is placed around stem 34 before stem 34 is so attached to valve member 28.

Catches 44 are formed on each exterior side of the body members at the end from which stem 34 protrudes. When the body members are united, these catches present a unitary form on each side of the body. Prior to such uniting assembly an annular seal 22 is pressed into annular groove 21 of each body member 10. Valve member 28 and stem 34 are attached as discussed above. Valve member 28 and stem 34 are then placed within a body member 10 so that key 31 is properly aligned within keyways 30 and O-ring 26 is disposed in O-ring groove 24. Body members 10 are next brought together so that raised pin 16 of one body member are inserted into complimentary pin recesses 18 of the other body member and O-ring 26 is properly disposed in both O-ring grooves 24. Finally, the body members 10 are, for example, ultrasonically welded so as to form a unitary body.

To close and lock valve member 28 in the closed position, as shown in FIG. 2, an axial force (illustrated by the arrows in FIG. 1) is placed on handle 40. Resilient latches 42 engage the body on the end from which stem 34 protrudes. Latches 42 resiliently bend outwardly over catches 44 as the axial motion continues and snap into place once moved past the hook edges of catches 44 to lock valve member 28 into the closed position, by preventing reverse axial motion, as shown in FIG. 2. This procedure is done quickly and in one motive step. Where plastic materials are used, the audible snap of the resilient latches against the body as they move past catches 44 upon locking assures the operator that valve member 28 is securely locked in the closed position.

To release the locking engagement, handle 40 is rotated about axis 100 to move latches 42 out of alignment with catches 44 so that reverse axial motion is now permitted. Stem 34 and valve member 28 can then be pulled out of the closed position to allow flow through passage 12. Handle 40 may be unlocked by clockwise or counterclockwise rotation.

Contrary to prior gate valves, the preferred embodiment provides swift flow cut off and a simultaneous locking of the valve in a closed position which prevents inadvertent opening by poultry in the immediate environment. Further, the audible snap on locking assures the operator that the valve is locked in the closed position without separate visual observation. Simple twisting motion releases the valve from its locked position.

From the preceding description of the preferred embodiments, it is evident that the objects of the present invention are attained. Although the invention has been described and illustrated above in detail, it is to be clearly understood that the same is by way of illustration and example only and is not to be taken by way of limitation. For example, a coil spring may be mounted about the valve stem outside the body members and below the valve stem handle to bias the gate valve open. However, the spirit and scope of the present invention are to be limited only by the terms of the appended claims.

What is claimed is:

1. A gate for use with poultry watering systems comprising:

a valve body having a fluid passageway therethrough;

said valve body having a pair of opposed side walls of a predetermined width and an intersecting pair of opposed face walls of a predetermined width substantially greater than the width of said side walls;

a valve member slideably disposed within said valve body between open and closed positions for controlling fluid flow through said passageway;

a valve stem means rotatably attached to said valve member and extending outside said valve body at one end thereof to form a handle portion;

said handle portion being disposed for one directional linear manipulation to move said valve member between said open and closed positions;

locking means for simultaneously locking said valve member in said closed position when said valve member is moved into said closed position by said linear motion of said valve stem;

said locking means including a pair of oppositely disposed catches formed on said side walls at said end of said valve body from which said valve stem extends and a corresponding pair of oppositely disposed latches formed as part of said handle portion;

said latches being spaced apart by a predetermined first distance corresponding to said width of said face walls;

said latches having a side width of a second predetermined distance;

said second predetermined distance being substantially less than said first predetermined distance so as as to facilitate visual aligning of said latches with said side walls and said catches prior to movement of said valve member into said closed position; and said latches being formed to snap-lock onto said catches with the provision of a distinct, audible snap when said valve member is moved into said closed position.

2. The gate valve according to claim 1 wherein said valve stem is rotatable with respect to said valve member and said valve body to release said valve member from said locked position.

3. The gate valve according to claim 2, wherein said valve body is formed from two half body members.

4. The gate valve according to claim 3, wherein said two half body members are ultrasonically welded to form said body member.

5. The gate valve according to claim 3, including sealing means for engaging said valve member which surround the flow passage and said sealing means being attached to each half of said body member.

6. The gate valve according to claim 1 wherein said latches are resilient and said latches and said catches are integrally molded with said valve body and said handle portion, respectively.

* * * * *